2,828,452

HUMIDITY PROTECTIVE TREATMENT FOR SELENIUM RECTIFIER CELLS

Adrian C. Billetdeaux, Braddock Hills, and Robert E. Shearer, Edgewood, Pa., assignors to Westinghouse Air Brake Company, Wilmerding, Pa., a corporation of Pennsylvania No Drawing. Application January 8, 1953
Serial No. 330,356

24 Claims. (Cl. 317—241)

Our invention relates to the manufacture of dry disc rectifiers, and particularly to the manufacture of humidity resistant rectifier cells.

In one well-known method of manufacturing selenium rectifier cells, the cells are subjected to an oil treatment prior to electroforming. It has been found that cells so treated are protected to some degree from the deleterious effects of humid conditions, the degree of protection varying widely in accordance with the mineral oil employed and in the methods employed during manufacture. Selenium cells which have halogen containing selenium layers or which are subjected to electrolytic solutions during the formation of the barrier layer, are adversely affected when operated or stored under humid conditions. It has also been noted in the manufacture of selenium cells wherein the individual cells are punched from a base plate, that the punching operation in some way changes the physical structure of the counterelectrode alloy. Apparently moisture enters through the counterelectrode layer causing a deterioration of the cell.

It is an object of our present invention to provide a method of manufacturing dry disc rectifier cells wherein the cells are treated with certain organic materials to impart to the cells a uniform high degree of humidity resistance.

A further object of our invention is to provide a method of manufacturing dry disc rectifier cells wherein non-aqueous solutions of organic materials are used in treating the cells.

According to our invention a water repellent film is applied to a selenium rectifier cell after the counterelectrode layer is applied. The water repellent film is thin enough and/or soft enough that good electrical contact is made with the counterelectrode layer. The thickness of the film providing the humidity protection is in the order of molecules, the particular materials selected for the purpose having a high adsorption bond with metal.

The molecular structure of the materials used in our process is polarized at one end, i. e., the molecule has a non-polar hydrocarbon portion and a small polar group. The polar group at the one end of the molecule has a strong affinity for metal, while the non-polar hydrocarbon portion of the molecule repels water. A material exhibiting this polarization or two-sided effect, is defined as an amphipathic material. Amides, esters and organic acids are examples of amphipathic materials and it is this type of organic materials which is used to impart humidity resistance to selenium rectifier cells.

Other objects and characteristics of our invention will become apparent as the description proceeds.

A material to be successfully used to impart humidity resistance to selenium rectifier cells must provide a film which is not readily displaced by water. Such a protective film must be permanent and not disturbed by atmospheres or temperatures encountered in the use or storage of the cells. The protective film must not cause deforming or damage to the rectifier cells. We have found that certain organic materials will provide such a permanent protective film.

In the use of mineral oil for immersion baths to impart humidity resistance to selenium cells, we have found that the degree of protection afforded varies widely. In order to improve the protection afforded, we have investigated organic materials which may be used in non-aqueous solutions. In certain organic materials, the molecular structure of the material is such that one end thereof has a strong affinity for metal while the other end repels water. Such amphipathic materials comprise amides, esters and organic acids. Dilute and saturated non-aqueous solutions of these materials were used in protecting the selenium cells because solubilities of some of the materials were slight. In preparing the non-aqueous solutions of amphipathic materials, we used mineral oils and chlorinated diphenyls as solvents. We have found that non-aqueous solutions in which the amphipathic materials in solution was approximately 0.001% by weight gave significant improvements in the protection and permanence of the films provided for the cells. When the materials used were non-polar, as for example, paraffin and micro-crystalline wax, the protection afforded was no greater than that provided by the previously known mineral oil immersion baths.

In manufacturing selenium rectifier cells employing our methods, selenium powder in its amorphous form is applied to a base plate and converted into its crystalline form by a heated press in the normal manner. The barrier or rectifying layer is then formed and the counterelectrode layer sprayed over the barrier layer. The cell is then immersed in a non-aqueous solution of an amphipathic material and the cell electroformed in the usual manner. We have found that the best results are obtained when the cells are immersed for several minutes in the immersion baths maintained at room temperature, the cells withdrawn and then electroformed. The cells may however be electroformed while immersed in the baths. The immersion baths for the rectifier cells are either dilute or saturated non-aqueous solutions of amphipathic materials.

Some of the amphipathic materials used in the immersion baths for the selenium rectifier cell were alkyl stearamide, polyamides of molecular weight of about 400, diethylene glycol oleate, diethylene glycol stearate, oleic acid, stearic acid, palmitic acid, etc. In the use of certain of these materials in mineral oil, as for example, a polyamide, the mineral oil was heated to the melting point of the material and the material added and stirred. Upon subsequent cooling of the mineral oil solution, that portion of the material not going into solution was precipitated and filtered out. It has been found by this method that non-aqueous solutions containing amphipathic materials of approximately 0.001% by weight are effective in providing greater humidity resistance to selenium cells than when mineral oil is used alone for the immersion baths.

The use of amphipathic materials in immersion baths to provide humidity resistance selenium cells materially reduces the deforming of the cells upon subsequent exposure to humid conditions. As an example of the improvement provided by the use of amphipathic materials, non-aqueous solutions of three esters, namely, polyethylene glycol stearate in a saturated solution, polypropylene glycol stearate in a 1% solution, and diethylene glycol mono oleate in a 1% solution, were used in the treatment of identical cells. The cells so treated and after electroforming were exposed to identical humidity conditions together with a sample lot of selenium cells treated in mineral oil immersion baths and then electroformed. At the end of the test exposure period, the cells treated with mineral oil deformed 37.4%. The deforming of the cells treated in the ester solutions was approximately 22.7% for the named saturated solution, 16.4% for the 1% solution of polypropylene glycol stearate, and only 10.3% for the 1% solution of diethylene glycol mono oleate.

It would appear, therefore, from our tests and observations that the deforming of selenium rectifier cells due to humid operating conditions may be materially reduced by the use of amphipathic materials in non-aqueous solutions, such solutions being either saturated solutions or solutions containing as little as 0.001% by weight of an amphipathic material.

Although we have herein described a method of using amphipathic materials in immersion baths for humidity-proofing selenium rectifier cells, it is understood that various changes and modifications may be made therein within the scope of the appended claims without departing from the spirit and scope of our invention.

Having thus described our invention, what we claim is:

1. The method of improving the humidity resistance of rectifier cells comprising a base plate, a layer of selenium and a counterelectrode, which comprises immersing the cells in a non-aqueous solution of an amphipathic material and forming the selenium cells.

2. The method of improving the humidity resistance of rectifier cells comprising a base plate, a layer of selenium and a counterelectrode, which comprises immersing the cells in a saturated non-aqueous solution of an amphipathic material and forming the selenium cells.

3. The method of improving the humidity resistance of rectifier cells comprising a base plate, a layer of selenium and a counterelectrode, which comprises immersing the cells in a dilute non-aqueous solution of an amphipathic material and forming the selenium cells.

4. The method of improving the humidity resistance of rectifier cells comprising a base plate, a layer of selenium and a counterelectrode, which comprises immersing the cells in a non-aqueous solution containing at least 0.001% by weight of an amphipathic material and forming the cells.

5. In a method of manufacturing a humidity resistance selenium rectifier cell, the step comprising immersing the selenium cell in a non-aqueous solution of an amphipathic material after the counterelectrode has been applied and before electroforming the cell.

6. In a method of manufacturing a humidity resistant selenium rectifier cell, the step comprising immersing the selenium cell in a non-aqueous solution of an amphipathic material for several minutes after the counterelectrode has been applied and before the selenium cell is formed.

7. In a method of manufacturing a humidity resistant selenium rectifier cell, the step comprising immersing the selenium cell in a non-aqueous solution of an ester after the counterelectrode has been applied to the selenium layer and before forming the cell.

8. In a method of manufacturing a humidity resistant selenium rectifier cell, the steps comprising immersing the selenium cell in a non-aqueous solution of an amide after the counterelectrode has been applied to the selenium layer, and then forming the cell.

9. In a method of manufacturing a humidity resistant selenium rectifier cell, the step comprising immersing the selenium cell in a non-aqueous solution of an organic acid after the counterelectrode has been applied to the selenium layer and before the cell is formed.

10. In a method of manufacturing a humidity resistant selenium rectifier cell, the steps comprising immersing the selenium cell in a non-aqueous solution containing at least 0.001% by weight of an ester after the counterelectrode has been applied to the selenium layer, and then forming the cell.

11. In a method of manufacturing a humidity resistant selenium rectifier cell, the steps comprising immersing the selenium cell in a non-aqueous solution containing at least 0.001% by weight of an amide after the counterelectrode has been applied to the selenium layer, and then forming the cell.

12. In a method of manufacturing a humidity resistant selenium rectifier cell, the step comprising immersing the selenium cell in a non-aqueous solution containing at least 0.001% by weight of an organic acid after the counterelectrode has been applied to the selenium layer and before the cell is formed.

13. In a method of manufacturing a humidity resistant selenium rectifier cell, the steps comprising immersing the selenium cell in a mineral oil solution of an amphipathic material after the counterelectrode has been applied to the selenium layer, and then forming the cell.

14. In a method of manufacturing a humidity resistant selenium rectifier cell, the steps comprising immersing the selenium cell in a mineral oil solution of an ester after the counterelectrode has been applied to the selenium layer, and then forming the cell.

15. In a method of manufacturing a humidity resistant selenium rectifier cell, the step comprising immersing the selenium cell in a mineral oil solution of an amide after the counterelectrode has been applied to the selenium layer and before the cell is formed.

16. In a method of manufacturing a humidity resistant selenium rectifier cell, the steps comprising immersing the selenium cell in a mineral oil solution of organic acid after the counterelectrode has been applied to the selenium layer, and then forming the cell.

17. In a method of manufacturing a humidity resistant selenium rectifier cell, the step comprising immersing the selenium cell in a chlorinated diphenyl solution of an amphipathic material after the counterelectrode has been applied to the selenium layer and before the cell is formed.

18. In a method of manufacturing a humidity resistant selenium rectifier cell, the steps comprising immersing the selenium cell in a chlorinated diphenyl solution of an ester after the counterelectrode has been applied to the selenium layer, and then forming the cell.

19. In a method of manufacturing a humidity resistant selenium rectifier cell, the step comprising, immersing the selenium cell in a chlorinated diphenyl solution of an amide after the counterelectrode has been applied to the selenium layer and before the cell is formed.

20. In a method of manufacturing a humidity resistant selenium rectifier cell, the step comprising, immersing the selenium cell in a chlorinated diphenyl solution of an organic acid after the counterelectrode has been applied to the selenium layer and before the cell is formed.

21. A selenium rectifier cell comprising a base plate, a layer of selenium, and a counterelectrode, said cell being made humidity resistant by immersing the cell in a non-aqueous solution of an amphipathic material.

22. A selenium rectifier cell comprising a base plate, a layer of selenium, and a counterelectrode, said cell being made humidity resistant by immersing the cell in a non-aqueous solution of an ester.

23. A selenium rectifier cell comprising a base plate, a layer of selenium, and a counterelectrode, said cell being made humidity resistant by immersing the cell in a non-aqueous solution of an amide.

24. A selenium rectifier cell comprising a base plate, a layer of selenium, and a counterelectrode, said cell being made humidity resistant by immersing the cell in a non-aqueous solution of organic acid.

References Cited in the file of this patent

UNITED STATES PATENTS

| | | |
|---|---|---|
| 2,080,299 | Benning et al. | May 11, 1937 |
| 2,108,641 | Blodgett | Feb. 15, 1938 |
| 2,153,811 | Montgomery | Apr. 11, 1939 |
| 2,345,122 | Herrmann | Mar. 28, 1944 |
| 2,471,898 | Rau | May 31, 1949 |
| 2,620,384 | Tarzian | Dec. 2, 1952 |